United States Patent Office 3,133,032
Patented May 12, 1964.

3,133,032
AQUEOUS DISPERSIONS OF AMINO RESINS AND ALKYD RESINS
Yun Jen and James A. Seneker, Anaheim, Calif., assignors to California Research Corporation, San Francisco, Calif., a corporation of Delaware
No Drawing. Filed June 2, 1960, Ser. No. 33,365
15 Claims. (Cl. 260—21)

This invention relates to the preparation of aqueous dispersions of mixtures of amino resins, such as the methylolureas and methylolmelamines and lower alkanol derivatives thereof, with water-dispersible alkyd resins. These compositions are useful as coating compositions, particularly as baking enamels.

Aqueous compositions containing dispersed therein mixed nitrogen-containing resins, known as aminoplasts, and water-dispersible alkyd resins, often oil-modified, are known. Thus, U.S. Patent No. 2,471,396 describes and claims the preparation of stable aqueous synthetic resin emulsions of the oil-in-water type involving the agitation in the presence of a proteinaceous emulsifying agent of the product resulting from the condensation of a mixture of phthalic glyceride alkyd resin of high acid number with a lower ether of a methylolmelamine employing an acidic condensing agent.

More recently issued U.S. Patent No. 2,853,459 describes and claims water-dispersed coating compositions comprising aqueous dispersions of dispersible alkyd resin and a triazine-aldehyde resin, the alkyd resin having been rendered water-dispersible by reacting preformed oil-modified alkyd resin with 15 to 25% of polyethylene glycol of molecular weight 300–2000.

Broadly, in accordance with the present invention, there are prepared water-dispersed coating compositions containing the components amino resin, such as urea- or melamine-formaldehyde and their lower ethers, and alkyd resin first rendered water-dispersible by condensing the alkyd-forming reactants in the presence of a water-soluble alkoxypolyethylene glycol modifier, such as methoxy or ethoxy polyethylene glycol, in amounts of 5 to 30%, preferably 10 to 20%, by weight, based on modifier and alkyd reactants, as taught in my copending application Serial No. 33,366, filed June 2, 1960. The water-dispersible alkyd and the amino resin, the latter ranging in proportions from 5 to 70%, preferably 10 to 50%, based on the two, by weight, are then brought together. This may simply be effected by admixing the two in water treated with a basic agent to adjust the pH of the system to a pH in the range 7 to 9, examples of basic agents being the alkylolamines, such as ethanolamine, diethanolamine, triethanolamine; the amines, such as diethylamine, triethylamine, dipropylamine, morpholine, tertiarybutylamine, N,N diethyl ethanolamine; and ammonia. The two components are added to the water, preferably distilled or deionized, in the proportions indicated to give a non-volatile solids content in the range, by weight, of 20 to 80%, preferably 30 to 70%, based on the combined weight of the water and resin components.

A convenient way of forming the aqueous dispersions herein contemplated is to prepare the alkyd resin of desired molecular weight of 1500–20,000 which can be measured in terms of viscosity and acid number, for example, 5 to 50, preferably 5 to 35. The resin is cooled and added to water to which has been added a basic agent for maintenance of the pH in the desired range, temperature of the mixture being around 15° to 75° C. To the resulting mixture is then added the aminoplast component. In order to maintain the desired temperature and to control viscosity, part of the water calculated to be present in the finished dispersion may be added just prior to or after the addition of the aminoplast. Finally, pigments, filters and the like can be incorporated into the dispersions, further stirring being done to effect complete dispersion.

The amino resins employed in accordance with the invention are known. These are the condensation products of formaldehyde with any of a number of nitrogen-containing compounds, such as amino or imino, amido or imido compounds, to give the so-called aminoplast resins, modified if desired by etherification with a lower alkanol, e.g., methanol, ethanol, isopropanol, propanol and butanol. The aminoplast resin may be water soluble. Or surprisingly, the aminoplast resin may be substantially water insoluble, for example, the butylated resins, in this case the alkyd component of the invention serving as emulsifying agent for the isoluble aminoplast.

In addition to urea and melamine as nitrogen-containing compounds, reference may be made to substituted melamines, triazoles, dicyandiamide, diazines, guanamine, substituted thiomeline, thiourea, guanidine, and cyanamide. Substituted guanamine resins such as hydroxyl alkyl guanamine-formaldehyde resins and dihydroxyl alkyl guanamine-formaldehyde resins may also be used. The methylolureas and methylolmelamines, and their lower alkanol ether derivatives, are preferred because of their ready availability. Moreover, for good shelf stability, the lower alkylated polymethylol nitrogen compounds are most desirable.

As an example of the preparation of the aminoplasts herein contemplated, reference is made to U.S. Patents Nos. 2,197,357 and 2,529,856, wherein it is taught to prepare melamine-formaldehyde resins by reacting alkanol, e.g., methanol, with a polymethylolmelamine in the presence of an acid for such length of time as is necessary to obtain a clear solution and to obtain reaction of the alkanol with the polymethylolamine. The solution is then preferably neutralized and made alkaline and concentrated by distillation in high vacuum until the concentration of resin solids is at least 80%.

The extent of methylolation on the nitrogen compound and the extent of alkylation with an alcohol afterwards can both be varied widely. In many cases, it is desirable to alkylate the methylol derivatives as completely as possible so as to render the resulting aminoplast component stable. The extent of methylolation generally will affect the reactivity of the aminoplast with the water-dispersable alkyd. Therefore, for maximum shelf-stability and quick reactivity, a hexamethylated hexamethylol melamine can be advantageously employed.

As indicated, the aminoplast component of this invention can be obtained commercially, usually under trade names, for example, Resloom M–75, a methylated methylolmelamine, and Resimene 878, and Resimene 881, both butylated methylolmelamine (Monsanto Chemical Co.); and Rhonite, a water-soluble urea-formaldehyde resin (Rohm & Haas).

The alkyd component employed in the present invention is particularly described in my copending application above-mentioned. The alkyd base resin is prepared by incorporating a monofunctional alkoxy polyethylene glycol, such as methoxy or ethoxy polyethylene glycol, in the alkyd-forming reactants and then effecting the polyesterification reaction. In the preparation of the alkyd resin component, conventional alkyd processing techniques and conventional alkyd-forming ingredients are employed. In general, the alkyd resins can be defined as complexes having molecular weights in the range 1500–20,000 (end group titration) which are formed from the esterification reaction of polyhydric alcohols, having 2 to 10 carbon atoms and 2 to 6 hydroxyl groups, and resinifying carboxylic organic acids, i.e., polybasic acids and their anhydrides, such as adipic acid, o-phthalic acid or phthalic anhydride, isophthalic acid and the various derivatives thereof as shown in U.S. Patents No. 2,627,-508 and No. 2,895,932. The polyesterification reaction, as known, can be carried out in the presence of a solvent (solvent method; see U.S. Patent No. 2,308,498) or in the absence of a solvent (fusion method).

Often, although in accordance with the present invention not necessarily, the alkyd as above described is modified by the introduction of organic monocarboxylic acid, monoglycerides and/or diglycerides derived from oils or fats of vegetable, animal or fish origin to replace a portion of the polycarboxylic acid in the resin. The amount of oil present in percent by weight of the final resin, calculated as triglyceride, which may range up to 85%, is known as oil length of the resin.

As examples of oil-modifying agents, there can be mentioned the oil fatty acids of castor, dehydrated castor, co-count, cottonseed, fish, linseed, oiticia, palmitic, perilla, safflower, soybean, tall, tung, and the like. Some of these oils, containing unsaturation, thereby capable of undergoing cross-linking or curing, are of the drying type, while others, containing no unsaturation, are of the non-drying type. As indicated, the resins of the present invention can be prepared from either or neither. Monobasic acids, such as butyric, 2-ethylhexoic, pelargonic, lauric, benzoic, t-butylbenzoic, toluic, hexoic, stearic, and the like can also be employed, desirably to modify the alkyd.

Customarily, the conversion of the above oils to the monoglyceride and/or diglyceride is effected by alcoholysis, i.e., reaction of the oil with polyhydric alcohol at elevated temperatures, for example, 425–450° F., in the presence of a transesterification catalyst, e.g., litharge, sodium alcoholate, calcium stearate, lithium ricinoleate, and the like, examples of the polyhydric alcohol being glycerol, trimethylolethane, trimethylolpropane, ethylene glycol, propylene glycol, diethylene glycol, dipropylene glycol, pentaerithritol, dipentaerithritol, sorbitol, mannitol, neopentyl glycol, and the like. Alcoholysis is determined to be complete when a sample of the reaction mixture diluted with 3–4 times its volume of methanol gives a clear solution (methanol test), or when three parts, by weight, of the reaction mixture mixed with one part of phthalic anhydride heated on a hot plate gives a clear melt (phthalic pill test).

As is known in the art, the oil modification of the resin can be effected by a direct one-stage cooking of monocarboxylic fatty acids with a polyhydric alcohol and a polycarboxylic acid. Further, a two-stage process is often employed, in accordance with which the alcoholysis reaction is effected in the first stage as above described, while in the second stage the mixture of partial esters is condensed or esterified with a polycarboxylic acid to the desired acid number, usually below 50, or to the desired viscosity, for example, U to Z, when the resin is diluted with 50%, by weight, of naphtha. When this second method of manufacturing the alkyd resin is employed, the modifier of the invention, e.g., methoxypolyethylene glycol, is added during the condensation step, namely, after the alcoholysis step.

The alkoxypolyethylene glycol modifiers employed in accordance with the invention are commercially available products, and can be obtained by effecting the condensation of ethylene oxide in the presence of a suitable alcohol, e.g., methanol or ethanol. They can be defined as substantially the water-soluble alkoxy monoether derivatives of polyethylene glycols, such as methoxy-, or ethoxypolyethylene glycols or the polyethylene glycol monoethyl and monoethyl derivatives of the polyethylene glycols, the latter ranging in average molecular weight from about 300 to 6000, preferably 300 to 1500 or 2000. The higher molecular weight materials are known as "Carbowaxes" and are offered commercially under a designated number, e.g., 300, 400, 600, 750 and up, indicating approximate average molecular weight, the 300 grade, for example, being formed of polyethylene glycols of molecular weight in the range 285–315.

The polyesterification reaction can be effected in conventional alkyd equipment, e.g., a stainless steel vessel equipped with stainless steel stirrer, for inert gas sparging, with means for recording temperatures and with condenser. Where the so-called "solvent cook" is adopted, the charge to the reaction vessel can contain approximately 5% of xylene or other suitable solvent. The polymerization reaction is normally carried out at 220–250° C., and at the end of reaction, the alkyd resin, a viscous mass, is cooled and employed in forming the final dispersion as above indicated.

The following examples illustrate the practice of the invention.

Example 1

To a stainless steel vessel equipped for stirring, inert gas sparging, heating and cooling, there are charged 117.9 lbs. safflower oil, 68.8 lbs. glycerol and 0.12 lb. lithium ricinoleate. The contents of the kettle are heated at a temperature of 245° to 250° C. until a sample forms a clear solution in methanol at a volume ratio of 1 part sample to 3 parts methanol. The contents of the kettle are then cooled to a temperature of 130° to 140° C., whereupon 131.2 lbs. isophthalic acid, 30.6 lbs. methoxy derivative of polyethylene glycol having an average molecular weight of 750, and 38.9 lbs. of para-tertiarybutylbenzoic acid. The resulting mixture is then carefully heated to remove the water of esterification, the temperature being allowed to rise to 230° C. and maintained at this temperature, the flow of nitrogen being reduced during the early part of the reaction to minimize loss of acids. When the viscosity (Gardner-Holdt) of the alkyd is "M" to "N" measured at 50% solids in xylene and has an acid number of about 10, the resin is cooled to a temperature of 110° to 120° C.

In the meantime, a separate vessel containing 355.9 lbs. of deionized water is heated to a temperature of 65° C., after which there is added to the water 5.6 lbs. of triethylamine. To the so-treated water, there is added, with stirring, the base alkyd prepared above, and an emulsion is formed. The temperature of the emulsion is adjusted to 75° C. and the pH, to 8 with triethylamine. 177.8 lbs. of Resimene 878 is then added to the preceding emulsion, Resimene 878 being a butylated methylol melamine resin dissolved in a mixture of 35% butanol and 15% butyl cellosolve at 50% solid with a Gardner-Holdt scale viscosity of "I" to "M" measured at 25° C. Additional deionized water in an amount of 107 lbs. is added at this stage, and, after stirring, the whole is cooled to 40° C.

The specifications of the final emulsion are as follows:

Solids=45% approximately (20 minutes at 135° C. Sample weight ca. 1 g. forced draft oven)
Viscosity=about 4000 cps. (25° C., Brookfield viscosimeter, spindle 6 at 20 r.p.m.)
pH=8

A 6-mil wet film is cast on tin plate and air-dried at room temperature to remove moisture. After baking at 135° C. for 20 minutes, a clear film is produced.

Example 2

1630 g. safflower oil, 0.205 g. Benthal (a mixture of 90% benzoic and 10% phthalic anhydride), 2.5 g. lithium ricinoleate, and 595 g. pentaerithritol are charged to a glass flask equipped with stainless steel stirrer, inlet for nitrogen gas, thermometer and a trap for removing water of condensation, heat being applied to the contents of the flask by means of an electric mantle controlled by a variable setting powerstat to a temperature of 250° C. When the sample of the reaction mixture forms a clear solution in methanol with a ration of 1:3 as in Example 1, there are added to the reaction vessel 332 g. methoxypolyethylene glycol derived from polyethylene glycol of average molecular weight 1540, 927 g. phthalic anhydride and 100 g. xylene. The whole is then reacted until viscosity of the mixture reaches "V" (Gardner-Holdt) at 60% in Socal 25 solvent (closely fractionated highly aromatic solvent of aniline point, 61.2; flash point, 114° F.; and distillation range 314–362° F.). The reaction mixture is then cooled to a temperature of 58° C., after which 160 g. of the alkyd is mixed with 80 g. of Resimene 878 at 50° C. and the two components are then dispersed, again at 65° to 70° C., in 208 g. of water containing 2 g. of N-methyl morpholine. Solids content of the final emulsion is 42.2% and the pH is 7.5.

Example 3

In equipment like that of Example 2, 385 g. safflower oil (to produce a short-oil alkyd of 37% modification), 225 g. glycerol, and 0.4 g. lithium ricinoleate are heated to a temperature of 245° to 250° C. until a sample forms a clear solution in methanol at a weight ratio of 1:3. The mixture is then cooled to a temperature of 130° to 140° C., whereupon 127 g. paratertiarybutylbenzoic acid, 429 g. isophthalic acid and 100 g. methoxypolyethylene glycol are added. The resulting mixture is then carefully heated until the viscosity reaches "M" at 50% in xylene and an acid number of 15.4. The resin is then cooled to a temperature of 110° to 120° C. Then, 285 g. of the above-formed alkyd are added to 295 g. of water at 85° C. containing 5 g. triethylamine. The temperature of the emulsion so formed is adjusted to 65° C. at which time 125 g. of Resimene 878 are added. Solids content of the final emulsion is 47% and the pH is 7.0. A film obtained from this resin was clear and hard after baked at 300° F. for 15 minutes.

Example 4

Example 3 is repeated, except that the isophthalic acid is replaced with an equivalent amount of adipic acid, namely, 384 g. The mixture, including the methoxypolyethylene glycol, is heated until the viscosity is "J," and, following cooling, the dispersion is formed and treated with the aminoplast resin—all as in Example 3. Here, also, a clear and hard film is obtained.

Example 5

In equipment similar to that of Example 2, 346 g. of 2-ethylhexoic acid, 348 g. of trimethylol ethane, 434 g. of isophthalic acid and 100 g. of methoxypolyethylene glycol are heated at a temperature of less than 250° C. until viscosity reaches "F" at 50% in xylene. The mixture is cooled to 100° C. whereupon 1310 g. of water containing 20 g. of triethylamine are added. The resulting emulsion is cooled to 70° C. and stirred for 90 minutes. To this mixture is added 412 g. of Resloom M-75 (a methylated methylol resin obtained from Monsanto Chemical Co., 80% solid in water) at 45° C. Then 500 g. of water are added to the mixture. The solids content of the final emulsion is 38.8% and pH is 8.9. A film baked at 350° C. for 30 minutes; a clear and hard film was obtained.

Example 6

The procedure of Example 3 is repeated, except that the Resimene 878 is replaced with Resloom M-75S. Solids content of the final emulsion is 45.6% and pH is 8.6. A film obtained from this resin by baking at 275° C. for 35 minutes was hard and tough.

Example 7

In the equipment of Example 2, 360 g. of trimethylol ethane, 363 g. of para-tertiarybutylbenzoic acid, 299 g. of adipic acid, 102 g. of isophthalic acid and 110 g. of methoxypolyethylene glycol are reacted, at a temperature of below 220° C., until viscosity reaches "Y" at 60% in xylene at 25° C. and an acid number of 16. The resulting resin is added to 1100 g. of water containing 20 g. of triethylamine. The emulsion so formed is cooled to 80° C. and stirred to 70° C. To the whole is added 412 g. of Resloom M-75S. The final emulsion is watery and thin. Solids content is 47% and pH is 7.2. After baking at 350° F. for 15 minutes a film is produced which is hard and clear with no cratering.

Example 8

This example is to show the preparation of a 37% non-drying alkyd-water dispersion.

In equipment like that used in preceding examples, 400 g. of coconut oil, 230 g. of glycerol and 0.32 g. of lithium ricinoleate are heated to a temperature of 250° C. When a sample of the reaction mixture forms a clear solution in methanol with a ratio of 1:3, as in Example 1, there are added to the reaction vessel 500 g. of isophthalic acid and 100 g. of methoxypolyethylene glycol, molecular weight 750. The whole is then reacted at 220° C. until viscosity of the mixture reaches "Z" at 50% in xylene and has an acid number of 15. Then, 1020 g. of the hot resin are added to 1000 g. of water containing 20 g. of triethylamine. The final emulsion is then cooled. Solids content of the emulsion is 50% and pH is 6.0. This emulsion can be mixed with a methylated methylol melamine and produce a clean film after baking at 300° F. for 15 minutes.

Example 9

In equipment like that used in preceding examples, 360 g. of trimethylol ethane, 363 g. of paratertiarybutylbenzoic acid, 299 g. of adipic acid, 128 g. of isophthalic acid and 200 g. of methoxypolyethylene glycol (molecular weight 750) are heated at a temperature of less than 220° C. until viscosity reaches "K" on Gardner-Holdt scale at 50% in xylene measured at 25° C. and the mixture has an acid number of 15.7. 1100 g. of the hot resin are added to 1320 g. of water containing 20 g. of triethylamine. Approximately 457 g. of Resloom M-75S are added to the emulsion formed. The result is a thick solution having a viscosity of "Z₄." Solids content of the final solution is 47% and pH is 7.2. The film produced from this emulsion is hard and clear.

Example 10

In equipment like that used in preceding examples, 360 g. of trimethylol ethane, 267 g. of para-tertiarybutylbenzoic acid, 10 g. of lauric acid, 299 g. of adipic acid, 175 g. of isophthalic acid and 220 g. of methoxypolyethylene glycol (molecular weight 750) are cooked below 225° C. until viscosity reaches "M" at 50% in xylene and the mixture has an acid number of 15. Then 1120 g. of the hot resin are added to 1650 g. of water containing 30 g. of triethylamine. The result is a translucent solution. Then, approximately 444 g. of Resloom M-75S are added to the emulsion. Solids content of the final emulsion is 44.4% and pH is 7.4. The film produced is clear and hard.

Example 11

309 g. of glycerol, 267 g. of para-tertiarybutylbenzoic acid, 10 g. lauric acid, 299 g. of adipic acid, 175 g. of isophthalic acid and 220 g. of methoxypolyethylene glycol (molecular weight 750) are heated at a temperature below 240° C. until viscosity reaches "M" at 50% in xylene and has an acid number of 8. The resulting resin is not soluble in xylene. 980 g. of the hot resin are added to 20 g. of triethylamine in 1450 g. of water. Approximately 427 g. of Resloom M–75S are added to the solution. Solids content of the final emulsion is 39% and pH is 7.8.

*Example 12*

230 g. of coconut oil, 269 g. of trimethylol ethane and 0.40 g. of lithium ricinoleate are heated at a temperature of 250° C. to complete the alcoholysis. After completion of alcoholysis, there are added 36 g. of para-tertiarybutylbenzoic acid, 332 g. of isophthalic acid and 100 g. of methoxypolyethylene glycol. The whole is then reacted at a temperature of less than 235° C. until viscosity reaches "D" at 50% in butyl cellosolve. The whole is then cooled. To the resin are added 1000 g. of water containing 30 g. of triethylamine. Then approximately 323 g. of Resloom M–75S are added to the emulsion formed. The mixture is then heated to 70° C. and cooled. Solids content of the final emulsion is 45.5% and pH is 9.0. The sample film produced is hard and clear.

*Example 13*

60 g. of trimethylol ethane, 350 g. of isophthalic acid, 295 g. of adipic acid, 277 g. propylene glycol and 100 g. methoxypolyethylene glycol (molecular weight 750) are cooked, in equipment similar to that used in preceding examples, but with a fractionation column, water being separated from the glycol and the glycol being returned to the reaction zone, until viscosity of the mixture reaches "G" at 50% in butyl cellosolve and has an acid number of 30. The whole is then cooled and 50 g. of triethylamine in 1078 g. of water are added. The result is a viscous solution. Approximately 361 g. of Resloom M–75S are added, which results in a sharp drop in viscosity. Solids content of the emulsion is 45% and pH is 7.9. A film sample appears clear and hard.

The compositions prepared in accordance with the present invention may be used to coat such surfaces as metal and wood, such as in the finishing of appliances and furniture.

Moreover, the water dispersed coating compositions can be applied to the surface to be treated by spraying, dipping, brushing and the like.

We claim:

1. Process for the preparation of aqueous dispersions of mixtures of amine-aldehyde resins and alkyd resins useful as coating compositions, which comprises dispersing in water an amine-aldehyde resin and a water-dispersible alkyd resin obtained by esterifying water-soluble aliphatic monoether derivative of polyethylene glycol having a molecular weight 300–6,000, a polyhydric alcohol of 2 to 10 carbon atoms, essentially all of which contains 3 to 6 hydroxyl groups, and a resinifying carboxylic organic acid-reacting compound selected from the group consisting of poly-basic acids and their anhydrides to produce an alkyd resin having a molecular weight in the range 1500–20,000, said aliphatic monoether derivative of polyethylene glycol being employed in an amount of 5 to 30% by weight based on polyhydric alcohol and carboxylic organic acid-reacting compound, the amine-aldehyde resin being present in an amount of 5 to 70% by weight based on it and alkyd resin, and the water, in an amount calculated to yield a solids content in the dispersion of 20 to 80%, by weight.

2. Process according to claim 1, wherein the pH of the water is maintained in the range 7 to 9, the aliphatic monoether derivative of polyethylene glycol is employed in an amount of 10 to 20%, the amine-aldehyde resin is present in an amount of 10 to 50%, and the water in an amount calculated to yield a solids content of 30 to 70%.

3. Process according to claim 2, wherein the aliphatic monoether derivative of polyethylene glycol is selected from the group consisting of methoxy- and ethoxypolyethylene glycol.

4. Process according to claim 3, wherein the resinifying organic acid-reacting compound is selected from the group consisting of isophthalic acid and phthalic anhydride.

5. Process for the preparation of aqueous dispersions of mixtures of amine-aldehyde resins and alkyd resins useful as coating compositions, which comprises dispersing in water an amine-aldehyde resin and a water-dispersible oil-modified alkyd resin obtained by condensing a water-soluble aliphatic monoether derivative of polyethylene glycol having a molecular weight 300–6,000, a resinifying carboxylic organic acid-reacting compound selected from the group consisting of polybasic acids and their anhydrides, and a fatty acid partial ester of a polyhydric alcohol calculated to give an oil modification up to 85%, said aliphatic monoether derivative of polyethylene glycol being employed in an amount of 5 to 30% by weight based on carboxylic organic acid-reacting compound and fatty acid partial ester, the amine-aldehyde resin in an amount of 5 to 70%, by weight, based on it and oil-modified alkyd resin and the water in an amount calculated to yield a solids content in the dispersion of 20 to 80%, by weight.

6. Process according to claim 5, wherein the pH of the water is maintained in the range 7 to 9, the aliphatic monoether derivative of polyethylene glycol is employed in an amount of 10 to 20%, the amine-aldehyde resin is present in an amount of 10 to 50%, and the water, in an amount calculated to yield a solids content of 30 to 70%.

7. Process according to claim 6 wherein, the aliphatic monoether derivative of polyethylene glycol is selected from the group consisting of methoxy- and ethoxypolyethylene glycol.

8. Process according to claim 7, wherein the resinifying organic acid-reacting compound is selected from the group consisting of isophthalic acid and phthalic anhydride.

9. A water-dispersion useful as a coating composition, consisting essentially of, dispersed in water, an amine-aldehyde resin, and an alkyd resin having a molecular weight in the range 1500–20,000, said alkyd resin being obtained by condensing, water-soluble aliphatic monoether derivative of polyethylene glycol having a molecular weight 300–6,000, a polyhydric alcohol of 2 to 10 carbon atoms, essentially all of which contains 3 to 6 hydroxyl groups, and a resinifying carboxylic organic acid-reacting compound selected from the group consisting of polybasic acids and their anhydrides, said aliphatic monoether derivative of polyethylene glycol being employed in an amount of 5 to 30% by weight based on polyhydric alcohol and resinifying carboxylic organic acid-reacting compound, the amine-aldehyde resin being present in an amount of 5 to 70%, by weight, based on it and alkyd resin, and the water, in an amount calculated to yield a solids content in the dispersion of 20 to 80% by weight.

10. Dispersion according to claim 9 having a pH in the range 7 to 9.

11. A water-dispersion useful as a coating composition consisting essentially of water and dispersed therein an amine-aldehyde resin and an oil-modified alkyd resin obtained by condensing water-soluble aliphatic monoether derivative of polyethylene glycol having a molecular weight 300–6,000, a resinifying carboxylic organic acid-reacting compound selected from the group consisting of polybasic acids and their anhydrides, and a fatty acid partial ester of a polyhydric alcohol calculated to give an oil modification up to 85%, said aliphatic monoether derivative of polyethylene glycol being employed in an amount of 5 to 30%, by weight, based on carboxylic organic acid-reacting compound and fatty acid partial ester, the amine-aldehyde resin, in an amount of 5 to 70%, by weight, based on it and oil-modified alkyd resin, and the water, in an amount calculated to yield in the dispersion a solids content in the range 20 to 80% by weight.

12. Composition according to claim 11, wherein the carboxylic organic acid-reacting compound is selected from the group consisting of isophthalic acid and phthalic anhydride, and the dispersion has a pH in the range 7 to 9.

13. Composition according to claim 12, wherein the aliphatic monoether derivative of polyethylene glycol is selected from the group consisting of methoxy- and ethoxypolyethylene glycol of molecular weight of at least 300.

14. Composition according to claim 13, wherein the amine-aldehyde resin is selected from the group consisting of lower alcohol-modified melamine-aldehyde resin and lower alcohol-modified urea-aldehyde resin.

15. Composition according to claim 14, wherein the aliphatic monoether derivative of polyethylene glycol is methoxypolyethylene glycol.

References Cited in the file of this patent

UNITED STATES PATENTS

| | | |
|---|---|---|
| 2,853,459 | Christenson et al. | Sept. 23, 1958 |
| 2,895,946 | Huffman | July 21, 1959 |
| 2,908,660 | Belanger | Oct. 13, 1959 |

OTHER REFERENCES

"Organic Coating Technology" (Payne), published by J. Wiley & Sons, 1954 (volume 1, pages 290–293 and 326–327 relied on).